Patented Oct. 26, 1954

2,692,845

UNITED STATES PATENT OFFICE 2,692,845

COMPOSITION CONTAINING STREPTOMYCIN GLUCURONOLACTONE MIXTURE

George W. Mast, Stamford, Conn., assignor to Commercial Solvents Corporation, Terre Haute, Ind., a corporation of Maryland No Drawing. Application December 31, 1949,
Serial No. 136,420

6 Claims. (Cl. 167—55)

This invention relates to streptomycin and especially relates to streptomycin compositions which inhibit the emergence of streptomycin-resistant bacterial strains.

Streptomycin is a powerful antibiotic substance which is very effective against gram negative bacteria such as *Escherichia coli*, and *Aerobacter aerogenes*. However, when streptomycin is used against such bacteria, there oftentimes emerges an overgrowth of mutants which are resistant to any further action of streptomycin. For example, in operations on the colon, streptomycin has been used to suppress the fecal flora and thereby diminish the risk of peritonitis but it has been found that after about 5 days of treatment, regardless of the dosage used, the coliform count will rise indicating the growth of streptomycin-resistant organisms.

The object of the present invention is to provide a therapeutic composition containing streptomycin to which bacteria do not become resistant.

I have found that when streptomycin is administered orally and simultaneously with a compound selected from the group consisting of glucuronolactone, and galacturonic acid there is a 99% reduction in coliform bacteria in the feces and the suppression can be maintained as long as the treatment is continued. In other words, any overgrowth of mutants which appears is not resistant to my new therapeutic composition and thus in operations on the colon the risk of peritonitis is greatly decreased.

Glucuronolactone is an inner anhydride of glucuronic acid, which forms spontaneously on dehydration of the acid. Galacturonic acid is a hexahydroxyaldehyde acid just as glucuronic acid is. For purposes of my invention the glucuronolactone and galacturonic acid can be administered in amounts sufficient to prevent the emergence of streptomycin-resistant organisms up to as much as is desired since glucuronolactone, galacturonic acid, streptomycin-glucuronolactone mixtures and streptomycin-galacturonic acid mixtures have been found to be non-toxic when administered orally to test mice in very large doses. An ideal ratio of glucuronolactone to streptomycin and of galacturonic acid to streptomycin is 4 to 1, however, a 3 to 1 ratio in many cases is sufficient and even less is sufficient in some cases, it being realized that with smaller amounts of glucuronolactone or galacturonic acid the bacterial suppression is merely lessened and not dissipated.

Streptomycin, being an unstable basic substance in its free form, is used in the form of a salt such as the sulfate, the chloride or any other non-toxic salt form, the anion of which is inert toward the antibiotic activity of streptomycin. Streptomycin is most frequently used in the form of streptomycin sulfate and for economic reasons I prefer to use it in this form. As has been noted above the amount of streptomycin to be used can only be stated relative to the amount of glucuronolactone and galacturonic acid, and vice versa since the optimum amount of streptomycin to be used for complete inhibition varies with the organism to be suppressed. It is to be noted that the ratios expressed above are founded on amounts of streptomycin base and not on amounts of streptomycin salt.

The following tables are offered to illustrate my invention. Table I shows the effect of streptomycin when administered orally by itself in 0.5 gm. doses four times daily. Reversion is seen to occur approximately 5 days after maximum suppresion is obtained indicating the emergence of streptomycin-resistant organisms.

Table I

| Dose | Days | No. of E. coli organisms per ml. stool |
|---|---|---|
| 0.5 gms. streptomycin four times daily | 1 | $10^7$ |
| | 2 | $10^8$ |
| | 3 | $10^7$ |
| | 4 | $10^3$ |
| | 5 | 0 |
| | 6 | 0 |
| | 7 | 0 |
| | 8 | 0 |
| | 9 | 0 |
| | 10 | $10^3$ |
| | 11 | $10^3$ |
| | 12 | $10^3$ |
| | 13 | $10^3$ |
| | 14 | $10^3$ |
| | 15 | $10^3$ |
| | 16 | $10^4$ |

Table II shows the effect of streptomycin plus glucuronolactone when administered in the indicated dose. It can be seen that when the combination is stopped and only streptomycin administered there is a rise in the number of organisms indicating that the organisms have become streptomycin-resistant. However, upon reinstatement of the streptomycin and glucuronolactone, *Escherichia coli* was again suppressed indicating that the organism is not resistant to the streptomycin-glucuronolactone combination.

Table II

| Dose | Days | No. of E. coli organisms per ml. stool |
|---|---|---|
| 0.5 gms. Streptomycin+2.0 gms. glucuronolactone four times per day | 1 | $10^5$ |
| | 2 | $10^6$ |
| | 3 | $10^7$ |
| | 4 | $10^5$ |
| | 5 | $10^3$ |
| | 6 | 0 |
| | 7 | 0 |
| | 8 | 0 |
| | 9 | 0 |
| | 10 | 0 |
| | 11 | 0 |
| | 12 | 0 |
| | 13 | 0 |
| | 14 | 0 |
| | 15 | 0 |
| | 16 | 0 |
| | 17 | 0 |
| | 18 | 0 |
| | 19 | 0 |
| | 20 | 0 |
| 0.5 gms. Streptomycin alone four times per day | 21 | $10^2$ |
| | 22 | $10^4$ |
| | 23 | $10^5$ |
| | 24 | $10^4$ |
| | 25 | $10^2$ |
| 0.5 gms. Streptomycin+2.0 gms. glucuronolactone four times per day | 26 | 0 |
| | 27 | 0 |
| | 28 | 0 |
| | 29 | 0 |
| | 30 | 0 |

A record of stool cultures made on a patient receiving two grams of streptomycin together with eight grams of galacturonic acid orally twice daily was made and the results are shown in the following table.

Table III

| | |
|---|---|
| Before treatment | E. coli, A. aerogenes, S. Citreus. |
| 2 days treatment | Substantial decrease in number of organisms. |
| 5 days treatment | No growth. |
| 21 days treatment | No growth. Treatment stopped. |
| 3 days after stopping treatment | A. aerogenes. |
| 5 days after stopping treatment | A. aerogenes, E. coli. |

It is to be understood that I am not to be limited to the examples as shown since obvious equivalents will occur to those skilled in the art which equivalents are to be considered part of my invention, the scope of which is outlined in this specification and the attached claims.

What I claim is:

1. A therapeutic composition in dosage form for oral administration to which coliform bacteria do not become resistant comprising a mixture of streptomycin and a compound selected from the group consisting of glucuronolactone and galacturonic acid.

2. A therapeutic composition in dosage form for oral administration to which coliform bacteria do not become resistant comprising a mixture of one part streptomycin and not substantially less than three parts of a compound selected from the group consisting of glucuronolactone and galacturonic acid.

3. A therapeutic composition in dosage form for oral administration to which coliform bacteria do not become resistant comprising a mixture of streptomycin and glucuronolactone.

4. A therapeutic composition in dosage form for oral administration to which coliform bacteria do not become resistant comprising a mixture of one part streptomycin and not substantially less than three parts glucuronolactone.

5. A therapeutic composition in dosage form for oral administration to which coliform bacteria do not become resistant comprising a mixture of streptomycin and galacturonic acid.

6. A therapeutic composition in dosage form for oral administration to which coliform bacteria do not become resistant comprising a mixture of one part streptomycin and not substantially less than three parts galacturonic acid.

References Cited in the file of this patent

UNITED STATES PATENTS

| Number | Name | Date |
|---|---|---|
| 2,481,805 | Whittingham | Sept. 13, 1949 |
| 2,583,534 | Mast | Jan. 29, 1952 |

OTHER REFERENCES

Science, June 1, 1945.

Williams, "Detoxification Mechanisms," John Wiley & Sons, Inc., N. Y., 1947, pp. 191–193.

Harrow, "Textbook of Biochemistry," Saunders Co., Phila., 4th ed., 1946, pp. 242–244.